(12) United States Patent
Dean

(10) Patent No.: US 7,086,689 B2
(45) Date of Patent: Aug. 8, 2006

(54) COMBINATION STEP AND STORAGE ASSEMBLY

(75) Inventor: Clay A Dean, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/004,666

(22) Filed: Dec. 3, 2004

(65) Prior Publication Data

US 2006/0119134 A1 Jun. 8, 2006

(51) Int. Cl.
*B60R 9/02* (2006.01)
(52) U.S. Cl. .................................. 296/182.1; 296/37.6
(58) Field of Classification Search ............. 296/182.1, 296/24.3, 37.1, 37.6, 37.13, 37.14, 146.1
See application file for complete search history.

(56) References Cited

U.S. PATENT DOCUMENTS

| | | | | |
|---|---|---|---|---|
| 3,764,048 | A * | 10/1973 | Gore ........................... 224/538 |
| 4,527,825 | A * | 7/1985 | Clouse ..................... 296/97.22 |
| 4,861,096 | A | 8/1989 | Hastings |
| 4,917,430 | A * | 4/1990 | Lawrence ................... 296/37.6 |
| 5,188,414 | A * | 2/1993 | Burnham et al. .......... 296/37.6 |
| 5,316,358 | A * | 5/1994 | Payne et al. ............... 296/37.6 |
| 5,615,922 | A * | 4/1997 | Blanchard .................. 296/37.6 |
| 5,895,086 | A * | 4/1999 | Carico ........................ 296/37.6 |
| 6,059,341 | A * | 5/2000 | Jensen et al. ............... 296/37.6 |
| 6,199,930 | B1 * | 3/2001 | Riley .......................... 296/37.6 |
| 6,340,191 | B1 * | 1/2002 | Brady ........................ 296/37.6 |
| 6,439,634 | B1 * | 8/2002 | Jensen et al. ............... 296/37.6 |
| 6,460,915 | B1 | 10/2002 | Bedi et al. |
| 6,466,128 | B1 * | 10/2002 | Pan ............................. 340/468 |
| 6,543,829 | B1 * | 4/2003 | Brown ....................... 296/37.6 |
| 6,756,693 | B1 | 6/2004 | Kennedy |
| 6,926,347 | B1 * | 8/2005 | Fior et al. ................. 296/182.1 |
| 2001/0038219 | A1 | 11/2001 | Clare et al. |
| 2002/0030373 | A1 * | 3/2002 | Brady ........................ 296/37.6 |
| 2002/0101089 | A1 * | 8/2002 | Brown ....................... 296/37.6 |
| 2005/0134070 | A1 * | 6/2005 | Plentis et al. .............. 296/37.1 |

FOREIGN PATENT DOCUMENTS

JP 05338561 * 12/1993 ................ 296/37.6

* cited by examiner

*Primary Examiner*—H Gutman
(74) *Attorney, Agent, or Firm*—Laura C. Hargitt

(57) ABSTRACT

A combination step and storage assembly for engagement with an automotive vehicle body adjacent a cargo bay area and an auxiliary storage compartment of the automotive vehicle body in accordance with the present invention includes at least one door member hingedly mounted to the vehicle body adjacent the cargo bay area. The door member is moveable between an open position and a closed position. The door member encloses the auxiliary storage compartment in the closed position and an inner surface of the door member defines a step in the open position.

22 Claims, 4 Drawing Sheets

COMBINATION STEP AND STORAGE ASSEMBLY

BACKGROUND OF THE INVENTION

The present invention relates generally to automotive vehicles and, in particular, to a combination step and storage assembly for an automotive vehicle having a cargo bay.

Pickup trucks (and vehicles having the characteristics of pickup trucks) have increased in popularity in recent years. These vehicles typically include a vehicle body having a substantially rectangular-shaped cargo bay extending rearwardly from a passenger compartment having side walls and an end gate or door for access to the cargo bay. As their popularity has increased, customer demand for flexibility and versatility with the pickup has increased at an equal if not greater pace. High among customer demands is the ability to access cargo stored in the cargo bay and increased storage for smaller items that need not be stored in the cargo bay and may not desirable to be stored in the vehicle passenger compartment. The most inaccessible location for cargo in the cargo bay is the area adjacent to the passenger compartment, which often requires a customer to climb into the cargo bay from the end gate area.

It is desirable, therefore, to provide an assembly for a vehicle having a cargo bay that allows a passenger to access cargo adjacent the passenger compartment. It is also desirable to provide easier access for ingress/egress to the cargo bay while providing auxiliary storage for items that need not be stored in the cargo bay and may not be desirable to be stored in the vehicle passenger compartment.

SUMMARY OF THE INVENTION

The present invention concerns a combination step and storage assembly for engagement with an automotive vehicle body adjacent a cargo bay area and an auxiliary storage compartment of the automotive vehicle body. The step and storage assembly includes at least one door member hingedly mounted to the vehicle body adjacent the cargo bay area that is moveable between an open position and a closed position. The door member encloses the auxiliary storage compartment in the closed position and an inner surface of the door member defines a step in the open position.

The door member of the step and storage assembly preferably includes a seal on a periphery of an inner surface thereof, which provides a watertight seal for the auxiliary storage compartment when the door member is in the closed position, enclosing the auxiliary storage compartment. In the open position, the door member defines a step and advantageously provides users of the vehicle easy step access into the cargo bay area. The inner surface of the door member is preferably coated with a material having a high coefficient of friction for easier use of the step during all types of ambient conditions. Preferably, the vehicle body includes an access door adjacent the door member that, in conjunction with the door member, provides ingress and egress access to a load floor in the cargo bay area.

The step and storage assembly in accordance with the present invention preferably includes a pair of door members hingedly mounted to opposing sides of the cargo bay area. The pair of door members advantageously allows access to either side of the cargo bay area. The step and storage assembly advantageously provides easier access for ingress/egress to the cargo bay while providing auxiliary storage for items where it is desirable to store such items in an auxiliary compartment that is separate from both the passenger compartment and the cargo bay area.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
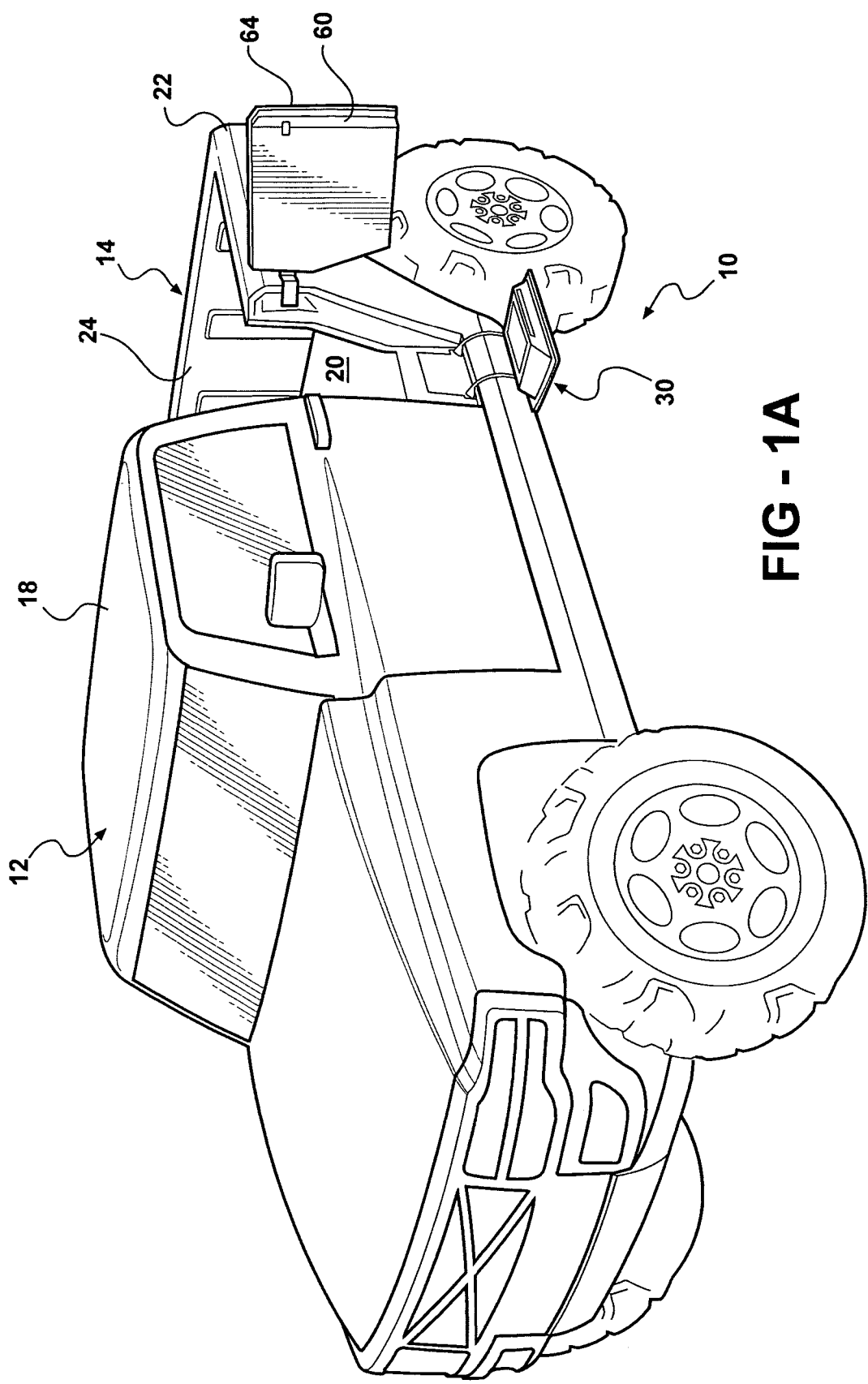
FIGS. 1A and 1B are perspective views of a vehicle body with a combination step and storage assembly in accordance with the present invention shown in an open position.
Figure 1B:
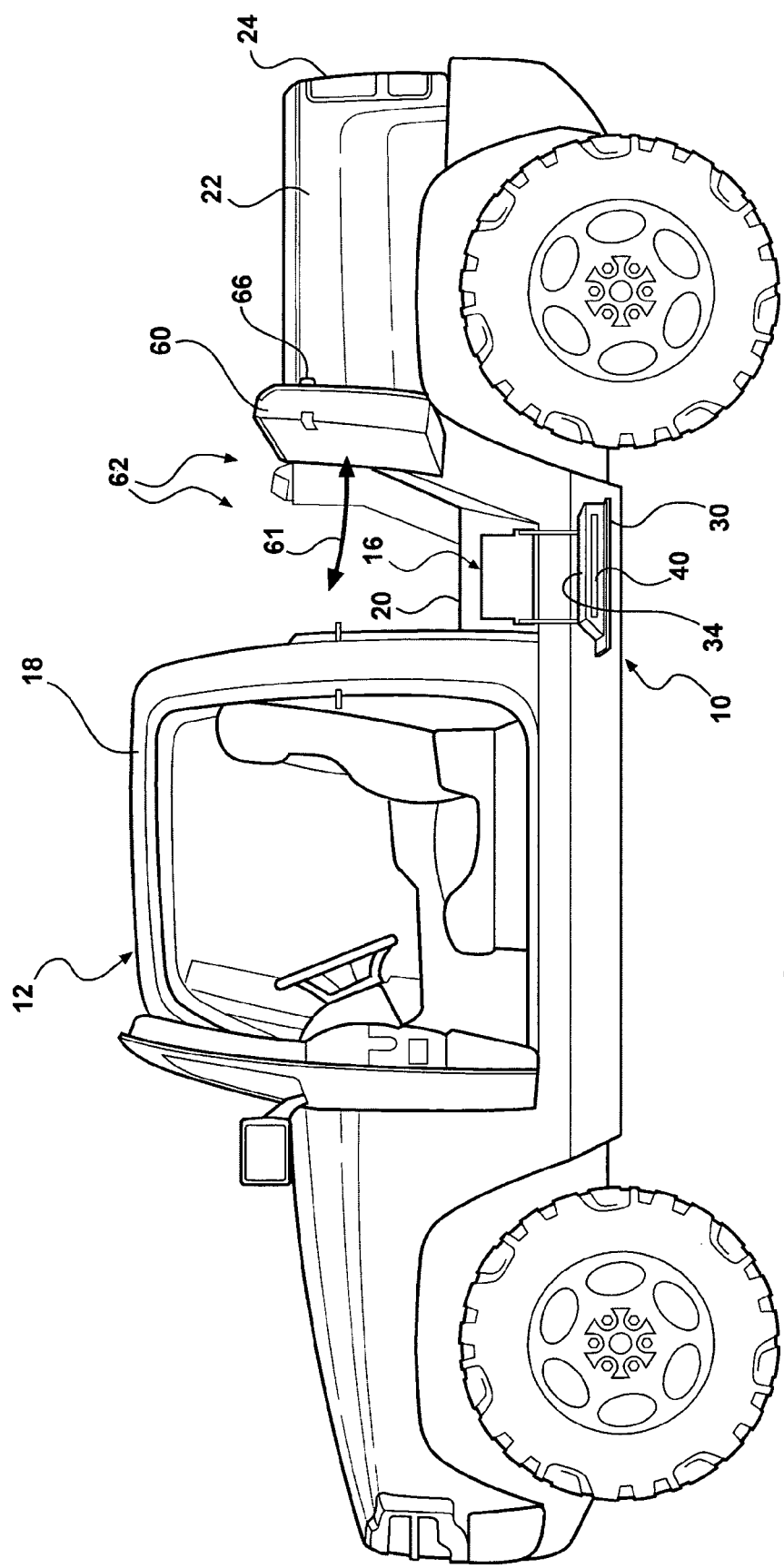

Referring now to FIGS. 1A and 1B, a combination step and storage assembly in accordance with the present invention is indicated generally at 10. The combination step and storage assembly 10 is adapted to engage with an automotive vehicle body 12 adjacent a cargo bay area 14 and an auxiliary storage compartment 16 thereof. The cargo bay area 14 is preferably a pickup truck cargo bed or the like extending rearwardly from a passenger compartment 18 of the vehicle body 12. The cargo bay area 14 is defined by a substantially planar load floor 20 extending between side walls 22 and a tailgate 24. Alternatively, the cargo bay area 14 includes a member (not shown) enclosing the area above the side walls 22 and the tailgate 24, such as a tonneau cover or the like. The auxiliary storage compartment 16 is preferably formed beneath the load floor 20 to provide storage without reducing the amount of space available in the cargo bay area 14. Alternatively, the auxiliary storage compartment 16 is formed in any location in the vehicle body 12 that is advantageous for storing items therein.

Figure 4:
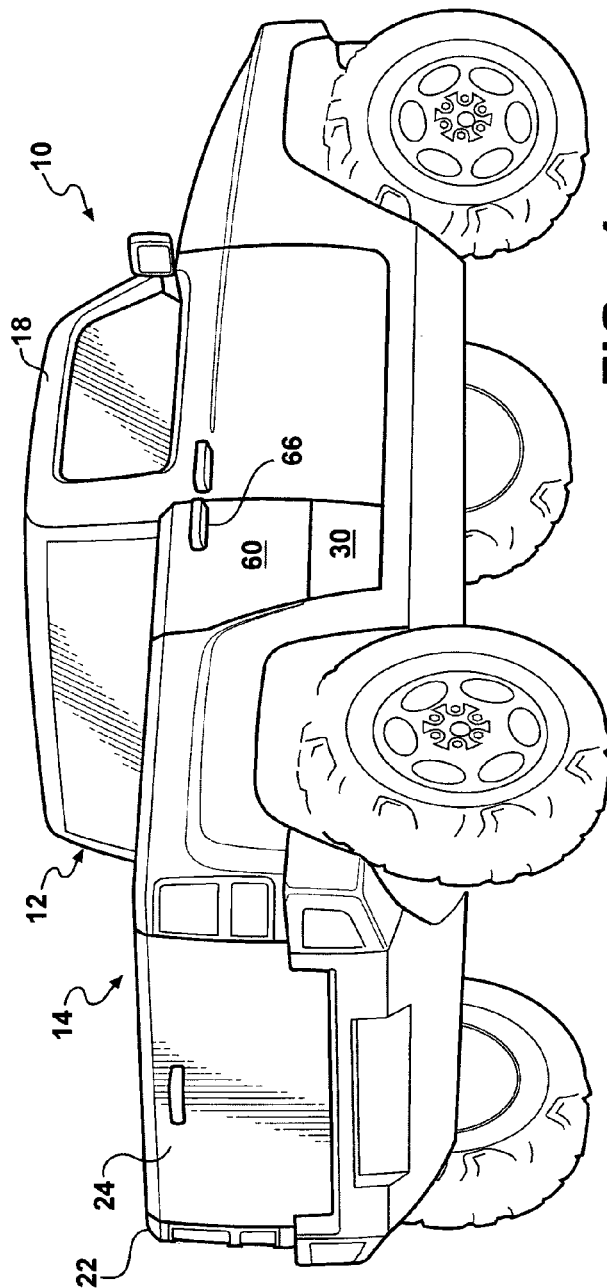
FIG. 4 is a perspective view of the vehicle body in FIGS. 1A and 1B with the step and storage assembly shown in a closed position.

The combination step and storage assembly 10 includes a door member 30 hingedly mounted to the vehicle body 12 adjacent the cargo bay area 14. The door member 30 is moveable by a pair of hinge members 31 in a direction indicated by an arrow 32 between an open position, shown in FIGS. 1A–3 and a closed position shown in FIG. 4. The hinge members 31 are preferably gooseneck-style hinges. Alternatively, other hinge members may be used, as will be appreciated by those skilled in the art, while remaining within the scope of the present invention. In the closed position, the door member 30 encloses the auxiliary storage compartment 16 and provides a smooth surface appearance for the exterior of the cargo bay area 14 of the vehicle body 12. In the open position, an inner surface 34 of the door member 30 defines a step, best seen in FIGS. 1A–3. When in the open position, the door member 30 is preferably substantially parallel to the ground thus allowing one to step on it in order to improve access to the cargo bay area 14. The inner surface 34 of the door member 30 is preferably coated with a material having a high coefficient of friction, such as an adhesive-applied friction pad or the like. The high coefficient of friction material provides easier use of the step during all types of ambient conditions. The hinge members 31 are preferably formed of steel or similar high strength material sufficient to support a person standing on the inner surface 34. The inner surface 34 of the door member 30 also includes a seal 36 on a periphery thereof. The seal 36 mates with a surface 38 that defines a periphery of the auxiliary storage compartment 16 on the vehicle body 12 to provide a watertight seal for the auxiliary storage compartment 16 when the door member 30 is in the closed position. In the open position, the door member 30 exposes the auxiliary storage compartment 16, allowing access to any items, such as wet items, loose items, or the like stored therein. A reflector member 40 is preferably disposed in an upper surface 42 of the door member 30, which provides greater visibility when the door member 30 is in the open position. As will be appreciated by those skilled in the art, the outer surfaces of the door member 30 may be contoured to fit with the corresponding mating walls of the cargo bay area 14 or the vehicle body 12 and the door member 30 may be sized to enclose an auxiliary storage compartment 16 of various selected sizes.

Figure 5:
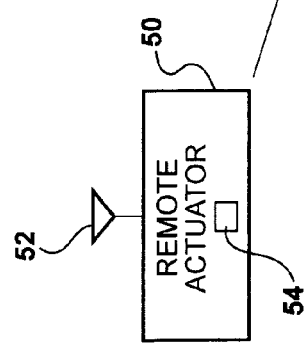
FIG. 5 is a schematic view of a latch for the combination step and storage assembly in accordance with the present invention.

Referring now to FIG. 5, a latch member, shown schematically at 44, is operable to hold the door member 30 in the closed position. An actuator 46 is connected to the latch member 44 and is operable to disengage the latch member 44 to release the door member 30 from the closed position. When the latch member 44 is disengaged, a spring 48 or similar biasing device is operable to move the door member 30 from the closed position to the open position, similar to a gas cap release. Preferably, the actuator 44 is located in the passenger compartment 18 of the vehicle body 12 to release the door member 30. Alternatively, or in conjunction with the actuator 44, a remote actuator 50 is provided that includes a transmitter 52 and pushbutton 54 for transmitting a signal to be received by a receiver 56 on the latch member 44. If the signal received by the receiver 56 is verified by a controller (not shown) or the like, a solenoid (not shown) or similar device disengages the latch member 44 and the spring 48 moves the door member 30 from the closed position to the open position, as outlined above.

When desired, the door member 30 is manually moved in the direction 32 to the closed position, where the spring 48 is compressed to aid in forming the watertight seal between the seal member 36 and the surface 38, and the latch member 44 again engages and retains the door member 30 in the closed position. The door member 30, therefore, may advantageously not be opened from outside the passenger compartment 18 unless the remote actuator 50 transmitting verifiable codes is utilized. This provides greater security for those items stored in the auxiliary storage compartment 16. Preferably, when the latch member 44 releases the door member 30 from the closed position, gravity allows the door member 30 to move from the closed position to the open position. Alternatively, the spring 48 includes a damper or the like to allow the door member 30 to move slowly and smoothly from the closed position to the open position.

Preferably, an access door 60 is hingedly attached to the side panel 22 of the cargo bay area 14 for alternately opening and closing an aperture 62 formed in the side panel 22 adjacent the passenger compartment 18 of the vehicle body 12. The access door 60 is moveable in a direction 61 between an open position, shown in FIGS. 1A–3 and a closed position shown in FIG. 4 and provides access to a forward portion of the cargo bay area 14 when in the open position. The aperture 62 is formed above the auxiliary storage compartment 16 and extends from the load surface 20 to an upper surface of the side panel 22 and a forward edge 64 of the access door 60 extends proximate to the passenger compartment 18 of the vehicle body 12. The access door 60 is preferably manually moved between the open and closed positions, held in place in the closed position by a conventional door lock and latch assembly (not shown) and opened with a conventional door handle 66, best seen in FIG. 4. The door member 30 and the access door 60 are preferably independently actuated, allowing the user of the vehicle to access the auxiliary storage compartment 16 or a forward portion of the cargo bay area 14 without requiring both the door member 30 and the access door 60 to both be in an open position.

Figure 2:
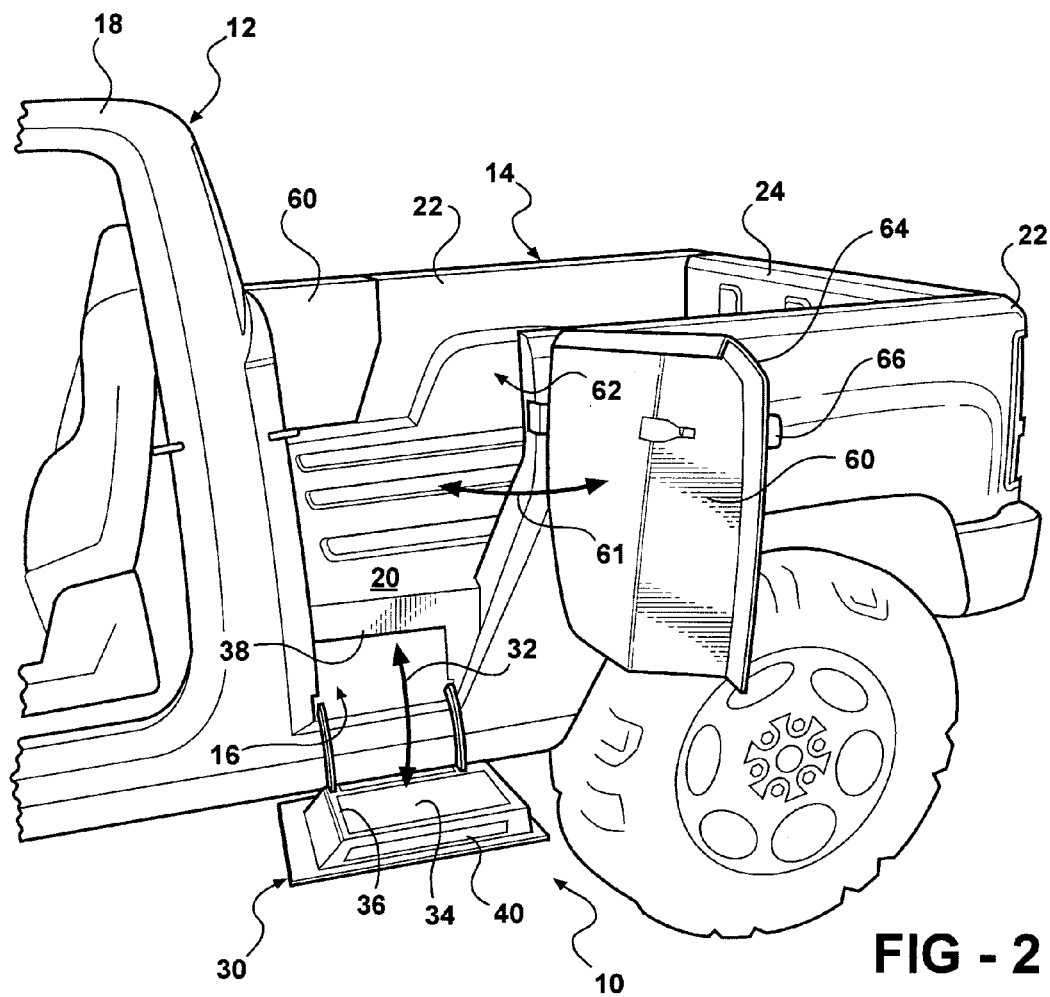
FIG. 2 is a fragmentary perspective view of the vehicle body in FIGS. 1A and 1B with the cargo bay area shown in greater detail.
Figure 3:
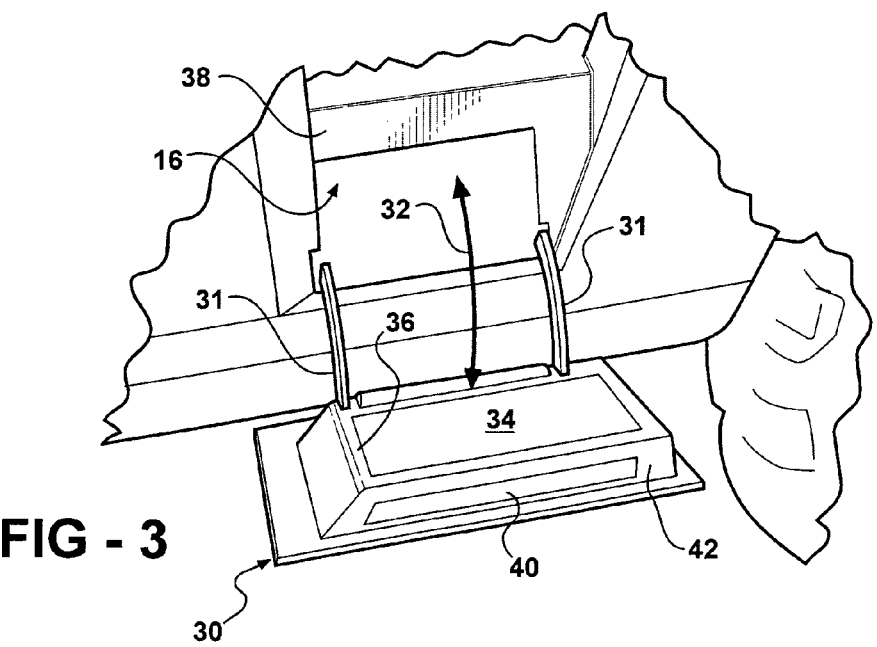
FIG. 3 is fragmentary perspective view of a combination step and storage assembly in accordance with the present invention.

Preferably, a pair of door members 30 and access doors 60 are formed in opposite sides of the vehicle body 12, best seen in FIGS. 1B and 2, each of which enclose a respective auxiliary storage compartment 16 and aperture 62, increasing the storage area available and the flexibility for storing items in the cargo bay area 14. The pair of door members 30 and access doors 60 advantageously allow access to either side of the cargo bay area 14 when in their respective open positions.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A combination step and storage assembly for engagement with an automotive vehicle body adjacent a cargo bay area and an auxiliary storage compartment of said automotive vehicle body, comprising:
   at least one door member hingedly mounted to said vehicle body adjacent said cargo bay area and moveable between an open position and a closed position, said at least one door member enclosing the auxiliary storage compartment in said closed position, an inner surface of said at least one door member defining a step in said open position, wherein said auxiliary storage compartment is formed below a load surface of said cargo bay area.

2. The step and storage assembly according to claim 1 wherein said at least one door member is a pair of door members each formed in an opposing side of said vehicle body.

3. The step and storage assembly according to claim 1 wherein said at least one door member is mounted to said vehicle body by a gooseneck hinge member.

4. The step and storage assembly according to claim 1 wherein said at least one door member includes a reflector member attached on an upper surface thereof.

5. The step and storage assembly according to claim 1 wherein said at least one door member includes a seal on a periphery of said inner surface thereof for providing a watertight seal for said auxiliary storage compartment.

6. The step and storage assembly according to claim 1 wherein said at least one door member is held in said closed position by a latch member and, when said latch member is released, said at least one door member is operable to be moved to said open position.

7. The step and storage assembly according to claim 6 wherein said latch is a spring-biased latch member.

8. The step and storage assembly according to claim 6 including an actuator operable to disengage said latch member.

9. The step and storage assembly according to claim 6 including a remote actuator for remotely disengaging said latch member.

10. An assembly for accessing cargo stored in a cargo bay area of an automotive vehicle, comprising:
- at least one door member hingedly mounted to said vehicle body adjacent said cargo bay area and moveable between an open position and a closed position, said at least one door member enclosing an auxiliary storage compartment in said closed position, an inner surface of said at least one auxiliary door member defining a step in said open position; and
- at least one access door hingedly mounted to said cargo bay area above said at least one door member and operable to move between an open position and a closed position to provide access to said cargo bay area when in said open position.

11. The assembly according to claim 10 wherein said at least one access door and said at least one door member are independently operable.

12. The assembly according to claim 10 wherein said at least one auxiliary door member is a pair of door members each formed in an opposing side of said vehicle body and said at least one access door is a pair of access doors each formed in an opposing side of said vehicle body.

13. The assembly according to claim 10 wherein said at least one auxiliary door member is mounted to said vehicle body by a gooseneck hinge member.

14. The assembly according to claim 10 including a damper attached to said at least one door member for slowly opening said at least one door member.

15. The assembly according to claim 10 wherein said at least one auxiliary door member includes a reflector member attached on an upper surface thereof.

16. The step and storage assembly according to claim 10 wherein said at least one door member includes a seal on a periphery of said inner surface thereof for providing a watertight seal for said auxiliary storage compartment.

17. A cargo bay assembly adapted to be attached to an automotive vehicle body, comprising:
- a cargo bay area extending rearwardly from said vehicle body and defining a load floor extending between side walls and a tailgate;
- at least one door member hingedly mounted to said vehicle body adjacent said cargo bay area and moveable between an open position and a closed position, said at least one auxiliary door member enclosing an auxiliary storage compartment formed beneath said load floor in said closed position, an inner surface of said at least one door member defining a step in said open position; and
- at least one access door hingedly mounted to said cargo bay area above said at least one door member and operable to move between an open position and a closed position to provide access to said cargo bay area when in said open position.

18. A combination step and storage assembly for engagement with an automotive vehicle body adjacent a cargo bay area and an auxiliary storage compartment of said automotive vehicle body, comprising:
- at least one door member hingedly mounted to said vehicle body adjacent said cargo bay area and moveable between an open position and a closed position, said at least one door member enclosing the auxiliary storage compartment in said closed position, an inner surface of said at least one door member defining a step in said open position, wherein said at least one door member is held in said closed position by a latch member and, when said latch member is released, said at least one door member is operable to be moved to said open position.

19. The step and storage assembly according to claim 18 wherein said at least one door member includes a seal on a periphery of said inner surface thereof for providing a watertight seal for said auxiliary storage compartment.

20. The step and storage assembly according to claim 18 wherein said latch is a spring-biased latch member.

21. The step and storage assembly according to claim 18 including an actuator operable to disengage said latch member.

22. The step and storage assembly according to claim 18 including a remote actuator for remotely disengaging said latch member.

* * * * *